Sept. 16, 1941.                J. TAYLOR                2,255,991
                              BATTERY CABLE
                           Filed Sept. 19, 1940
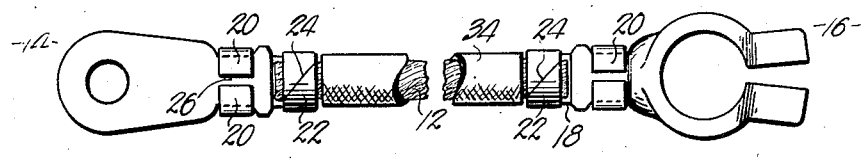
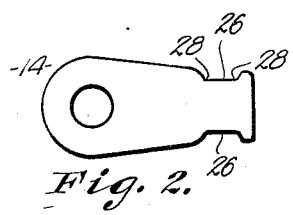
Fig. 2.
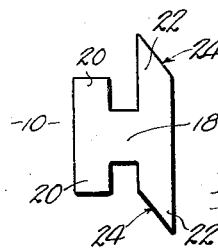
Fig. 4.
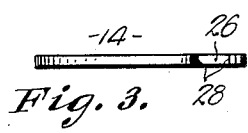
Fig. 3.
Fig. 5.
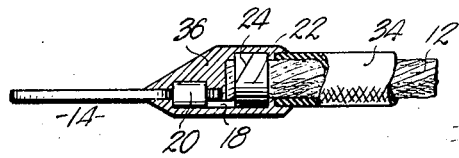
Fig. 6.
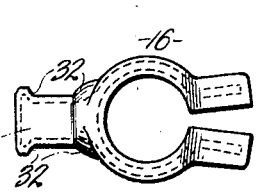
Fig. 7.
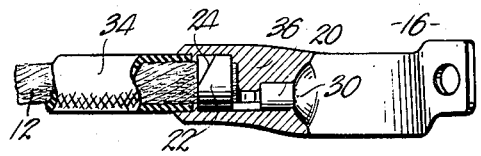
Fig. 9.
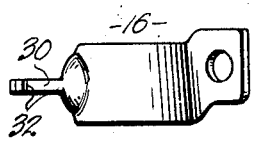
Fig. 8.
INVENTOR.
John Taylor
BY
ATTORNEY.

Patented Sept. 16, 1941

2,255,991

UNITED STATES PATENT OFFICE 2,255,991

BATTERY CABLE

John Taylor, Kansas City, Mo.

Application September 19, 1940, Serial No. 357,342

3 Claims. (Cl. 173—259)

This invention relates to battery cables and particularly the terminal elements at the ends thereof that are specially designed to form a connection between the conductor of the cable and a battery post and/or an element of an automobile or the like.

One of the important aims of this invention is to provide means for connecting the attenuated conductor of a battery cable, which means includes a part that may be used at either end of the conductor for the purpose of securing to the latter, a terminal plate or a terminal head, as the case may be, said part being in the nature of an article of manufacture that is inexpensive to make and easy to apply.

Another important aim of this invention is the provision of a terminal plate and a terminal head for battery cables, portions of each of which are alike and contoured to cooperate with a tie-anchor that serves to affix either the terminal plate or terminal head in the operative position.

This invention has for a still further object, the provision of a combination of parts, some of which are interchangeable prior to their being affixed to the cable conductor, and all of which are embedded in an encasing body forming a part of the assembly after the elements have been operatively associated.

Details of construction constituting minor objects of the invention and the manner in which the component parts of the battery cable assembly may be brought together to create an effective, desirable and rugged electrical conductor, will appear during the course of the following specification, referring to the accompanying drawing wherein:

Figure 1 is a side elevational view of a battery cable having connecting means thereon made in accordance with the present invention.

Fig. 2 is an elevational view of the terminal plate per se.

Fig. 3 is an edge view of said plate.

Fig. 4 is an elevational view of the tie-anchor blank.

Fig. 5 is an end elevational view of the said tie-anchor blank.

Fig. 6 is a fragmentary partial sectional view through one end of the battery cable illustrating the manner of affixing the terminal plate thereto.

Fig. 7 is a side elevational view of the terminal head.

Fig. 8 is an edge view of said terminal head; and

Fig. 9 is a fragmentary sectional view through a portion of the battery cable, illustrating the manner in which the terminal head is affixed to one end thereof.

It is desirable in the art of manufacturing and handling battery cables, to construct the connecting elements as cheaply as possible and to permit the mechanic or dealer to apply at least one of the connecting means after the length of the battery cable desired has been determined.

It is further advantageous in the manufacture of battery cables to reduce as much as possible, the number of parts required to form a complete cable assembly and therefore, minimize the manufacturing cost, both as to dies, material and labor.

It has been found in actual practice that an interchangeable tie-anchor made substantially as illustrated in the accompanying drawing, and capable of fastening at least two types of terminals to the conductor of the cable, will fulfill many of the requirements above set down.

The preferred embodiment of the invention therefore, comprises a tie-anchor generally designated by the numeral 10, which engages the stranded conductor 12 of the cable when either terminal plate 14 or terminal head 16 is to be affixed thereto. This tie-anchor is initially flat, as illustrated in Fig. 4, and the blank thereof includes a central neck 18 having laterally extending lugs 20, at one end thereof, and similarly disposed ears 22 at the other end.

Ears 22 are pointed for the purpose of piercing a flat stranded conductor of conventional type, if such be necessary, and the inclined edges 24 of ears 22 lie in abutting relation when the ears have been pressed around conductor 12. These ears 22 when bent to embrace conductor 12, create a circumscribing ring, shown in Figs. 1, 6 and 9. The ring so formed is likewise illustrated in dotted lines of Fig. 5.

From the immediate foregoing, it is obvious that the material from which tie-anchor 10 is created, should be flexible sheet metal capable of maintaining the form into which it is forced when the user is affixing either terminal plate 14 or head 16 to conductor 12.

Lugs 20 are foldable to the position shown in Figs. 1, 5, 6 and 9 and by virtue of the hereinafter described part of terminal plate 14 and head 16, will serve to completely anchor the said terminals in place.

Terminal plate 14 is a stamping created from flat material and having as an essential part thereof, opposed notches 26 at the ends of which are shoulders 28. The terminal head 16 is usually cast of brass or material having high electrical conductivity and when so made, must include a fin 30 of reduced width to present shoulders 32 to cooperate with tie-anchor 10 in precisely the same manner as do shoulders 28 of terminal plate 14.

In assembly, tie-anchor 10 is folded around a portion of conductor 12 at the end thereof that has been freed of insulating material 34. Lugs 20 are folded about the relatively narrow part of either terminal plate 14 or terminal head 16, as the case may be, and thereafter an encasing body 36 of lead or similar substance, is molded around the parts, as illustrated in Figs. 6 and 9. This encasing body 36 has all of tie-anchor 10 embedded therein and extends over a part of conductor 12 and preferably insulation 34 thereon. A rigid connection is thereby created which is free from possibilities of corroding due to flexing and the introduction of moisture and foreign matter.

Body 36 protects the parts against corrosion from acids at a zone where such action usually occurs in cables not constructed according to the foregoing specification.

Body 36 is formed of lead and supplements tie-anchor 10 to afford full maximum contact between conductor 12 and plate 14 or head 16, as the case may be. If body 36 is created as illustrated, only the diameter of conductor 12 limits conductivity.

A suitable mold, not here shown, is employed to emplace body 36. The outer face of the end wall of head 16 around fin 30 is convex to cooperate with the mold and to insure positive contact between body 36 and head 16.

Because of the construction permitted by following my invention, head 16 (and plate 14, if desired), may be made relatively thin as shown in dotted lines of Fig. 7, to be covered with a relatively thick coating of molded material. Not only is the cost of manufacture reduced, but a longer lasting unit is produced by such method of construction.

Only one terminal plate 14 and one terminal head 16 is required to complete a battery cable of any type, gauge or length. Duplications with added material costs are eliminated to an advantageous degree.

The advantages arising from this invention extend beyond those realized in the shop, for the manufacture of complete cables is simplified to the extent indicated above. Specific forms of parts have of necessity been described by reference to the preferred embodiment of the invention illustrated in the drawing, but since the concepts of the invention extend beyond such confining specification, it is desired to be limited only by the scope of the appended claims.

Having thus described the invention, what is claimed as new and desired to be secured by Letters Patent is:

1. In a cable of the character described having a conductor, means for connecting the cable comprising a split-ring forming a terminal head; a radially extending fin on the head; and a separate anchor to tie the head to said conductor, said head having a convex outer face around the point of connection between the head and said fin, said anchor having lugs embracing the fin and ears circumscribing said conductor, said anchor being embedded in a body molded therearound, the said body having one end thereof in contact with the said convex outer face of the head.

2. In a cable of the character described having a conductor, means for connecting the cable comprising a terminal member; and a separate anchor to tie the member to the conductor, said terminal member having a flat fin provided with a pair of spaced apart shoulders on each of two opposite edges thereof, said anchor comprising a body having a pair of opposed laterally extending ears at each end thereof, the ears of one of said pairs being bent around said conductor, the ears of the other of said pairs being bent to enter between the shoulders and circumscribe the portion of the flat fins between the said shoulders whereby the terminal member and anchor are interlocked to prevent lateral and longitudinal movement thereof.

3. In a cable of the character described having a conductor, means for connecting the cable comprising a terminal member; and a separate anchor to tie the member to the conductor, said terminal member having a flat fin provided with a pair of spaced apart shoulders on each of two opposite edges thereof, said anchor comprising a body having a pair of opposed laterally extending ears at each end thereof, the ears of one of said pairs being bent around said conductor, the ears of the other of said pairs being bent to enter between the shoulders and circumscribe the portion of the flat fins between the said shoulders whereby the terminal member and anchor are interlocked to prevent lateral and longitudinal movement thereof, said anchor being embedded in a body molded therearound to retain one pair of the ears thereof in interlocked relationship with the flat fin of the terminal member, and the other pair of ears in contact with the cable.

JOHN TAYLOR.